United States Patent
Han et al.

(10) Patent No.: US 8,647,759 B2
(45) Date of Patent: Feb. 11, 2014

(54) SECONDARY BATTERY

(75) Inventors: Minyeol Han, Yongin-si (KR);
Jeongwon Oh, Yongin-si (KR);
Sangwon Byun, Yongin-si (KR);
Sooseok Choi, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 96 days.

(21) Appl. No.: 13/460,706

(22) Filed: Apr. 30, 2012

(65) Prior Publication Data

US 2013/0115511 A1    May 9, 2013

(30) Foreign Application Priority Data

Nov. 7, 2011  (KR) .................. 10-2011-0115212

(51) Int. Cl.
*H01M 2/12* (2006.01)
*H01M 10/34* (2006.01)

(52) U.S. Cl.
USPC .................. 429/54; 429/53; 429/57; 429/82

(58) Field of Classification Search
None
See application file for complete search history.

(56) References Cited

U.S. PATENT DOCUMENTS

| | | | |
|---|---|---|---|
| 2004/0234842 A1* | 11/2004 | Kawano et al. | ................ 429/54 |
| 2010/0291421 A1 | 11/2010 | Byun et al. | |
| 2011/0183193 A1 | 7/2011 | Byun et al. | |
| 2011/0183198 A1 | 7/2011 | Byun et al. | |

FOREIGN PATENT DOCUMENTS

| KR | 10-2010-0123598 A | 11/2010 |
|---|---|---|
| KR | 10-1042808 B1 | 6/2011 |
| KR | 10-2011-0087566 | 8/2011 |

* cited by examiner

*Primary Examiner* — Cynthia K. Walls
(74) *Attorney, Agent, or Firm* — Christie, Parker & Hale, LLP

(57) ABSTRACT

A secondary battery includes an electrode assembly including a first electrode, a second electrode, and a separator between the first electrode and the second electrode, a case accommodating the electrode assembly, a cap assembly including a cap plate having a first through-hole and coupled to the case and a short-circuiting member electrically coupled to one of the first and second electrodes, and a displacement plate in the first through-hole and spaced from a bottom surface of the short-circuiting member at a first position, and configured to be separated from the first through-hole and to contact the bottom surface of the short-circuiting member at a second position.

15 Claims, 6 Drawing Sheets

SECONDARY BATTERY

CROSS-REFERENCE TO RELATED APPLICATION

This application claims priority to and the benefit of Korean Patent Application No. 10-2011-0115212, filed on Nov. 7, 2011, in the Korean Intellectual Property Office, the entire content of which is incorporated herein by reference.

BACKGROUND

1. Field

Embodiments of the present invention relate to a secondary battery.

2. Description of Related Art

In a secondary battery, large-capacity batteries, in which a number of battery cells are made into a battery pack, are used as the power source for motor driven devices such as hybrid electric vehicles. The secondary battery is generally manufactured by forming an electrode assembly by positioning a separator as an insulator between a positive electrode and a negative electrode, inserting an electrolyte into a case, and assembling a cap assembly having electrode terminals with the case by allowing the cap assembly to seal an opening of the case.

Meanwhile, when excess heat is generated due to overcharge conditions or electrolyte decomposition, an internal pressure of the secondary battery may increase, potentially resulting in fire or explosion. Accordingly, a secondary battery of improved safety is desired.

SUMMARY

Embodiments of the present invention are directed to a secondary battery of improved safety by improving a short-circuit inducing structure in an event of over-charge.

Aspects of embodiments of the present invention provide a secondary battery including an electrode assembly including a first electrode, a second electrode, and a separator between the first electrode and the second electrode, a case accommodating the electrode assembly, a cap assembly including a cap plate having a first through-hole and coupled to the case and a short-circuiting member electrically coupled to one of the first and second electrodes, and a displacement plate in the first through-hole and spaced from a bottom surface of the short-circuiting member at a first position, and configured to be separated from the first through-hole and to contact the bottom surface of the short-circuiting member at a second position.

The displacement plate may be welded to the cap plate.

One or more welding portions of the displacement plate may be configured to be ruptured when the displacement plate moves to the second position from the first position.

The cap plate may further include a protrusion protruding toward an interior of the first through-hole.

The protrusion may be configured to be broken by movement of the displacement plate.

The displacement plate may be electrically coupled to the cap plate by a connecting member, and may be configured to remain electrically coupled to the cap plate when the displacement plate moves.

The connecting member may include a lead wire having exposed ends and configured to be fixed to the displacement plate, and an insulating member partially surrounding the lead wire.

The short-circuiting member may have a second through-hole at a location corresponding to the displacement plate.

The second through-hole may have an area that is smaller than that of the displacement plate.

The secondary battery may further include a guide member at least partially located in the second through-hole and including a first side coupled to a top surface of the displacement plate and a second side coupled to an upper insulating member on the short-circuiting member.

The guide member may include a spring.

The secondary battery may further include a first collector plate electrically coupled to the first electrode, and a second collector plate electrically coupled to the second electrode, wherein the displacement plate is electrically coupled to one of the first collector plate or the second collector plate by a connecting member.

The first collector plate may include a first extending portion coupled to the first electrode, and a first connecting portion extending from the first extending portion and coupled to a first electrode terminal of the first electrode.

The first connecting portion may include a fuse region.

The second collector plate may include a second extending portion coupled to the second electrode, and a second connecting portion extending from the second extending portion and coupled to a second electrode terminal of the second electrode.

As described above, since the secondary battery according to embodiments of the present invention includes a cap plate having a displacement plate shifted in response to an increase in the internal pressure of the case, a short circuit is induced in an event of over-charge, thereby increasing the safety of the battery.

In addition, since the secondary battery according to embodiments of the present invention includes a displacement plate separated from a cap plate, wherein the displacement plate may be thicker than a short-circuit inducing structure integrally formed with the cap plate, defects, such as crumpling or ripping of the displacement plate, may be avoided, thereby increasing the safety of the battery.

Additional aspects of embodiments of the invention will be set forth in part in the description that follows and, in part, may be obvious from the description, or may be learned by practice of embodiments of the invention.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Example embodiments of the present invention will now be described more fully hereinafter with reference to the accompanying drawings.

Figure 1:
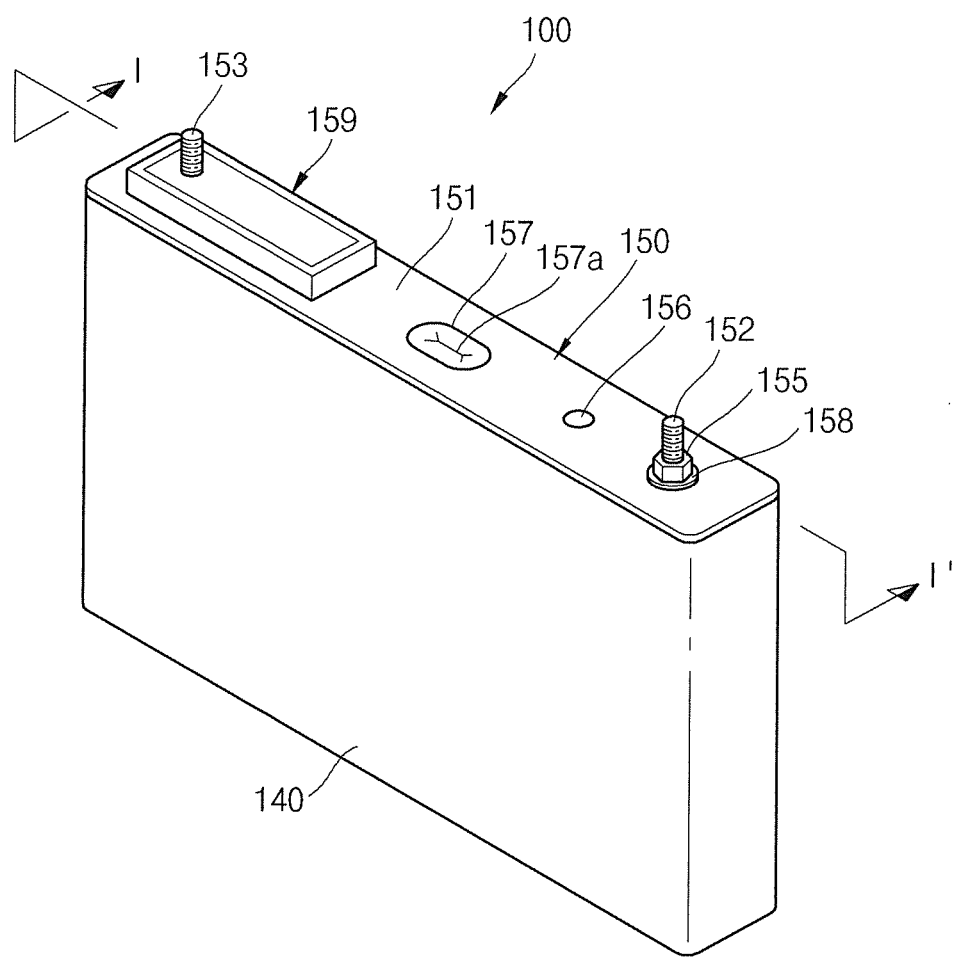
FIG. 1 is a perspective view of a secondary battery according to an embodiment of the present invention.
Figure 2:
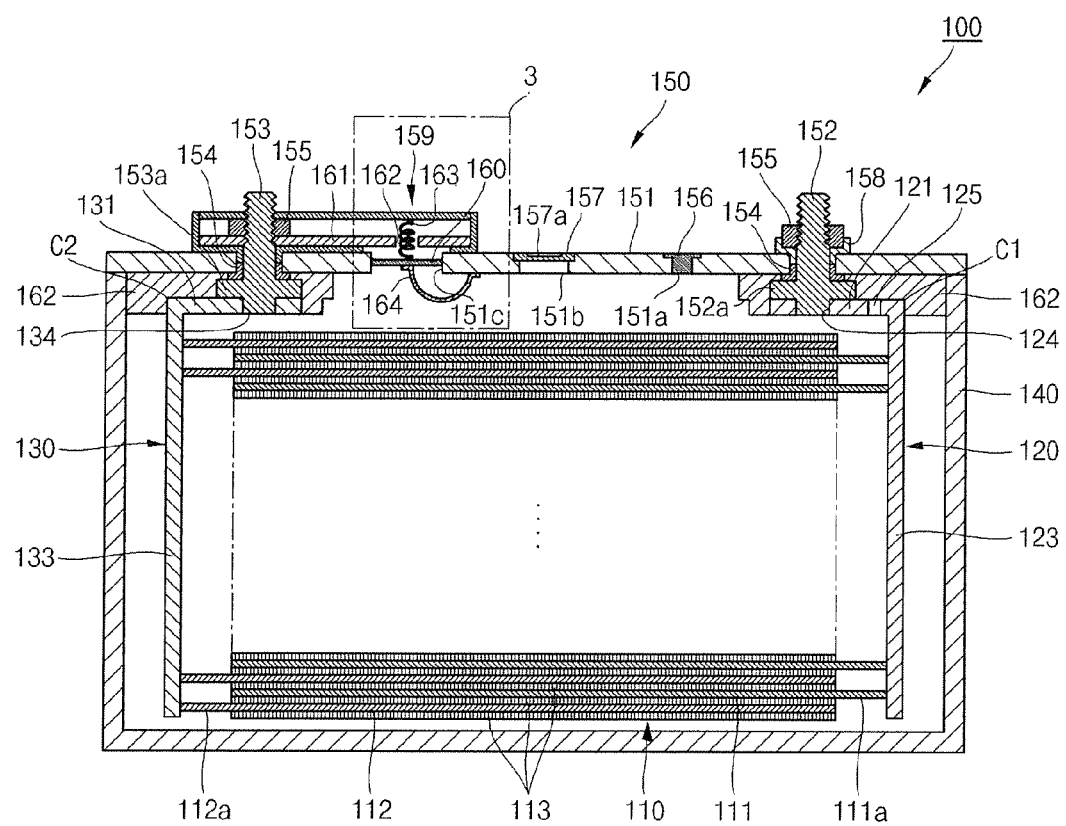
FIG. 2 is a cross-sectional view of the secondary battery taken along the line I-I' of FIG. 1.

FIG. 1 is a perspective view of a secondary battery according to an embodiment of the present invention, and FIG. 2 is a cross-sectional view of the secondary battery taken along the line I-I' of FIG. 1.

Referring to FIGS. 1 and 2, the secondary battery 100 according to the present embodiment of the present invention includes an electrode assembly 110, a case 140, a cap assembly 150 and a displacement plate 160.

The electrode assembly 110 is formed by winding or stacking a stacked structure including a first electrode plate 111, a separator 113 and a second electrode plate 112, which may be formed of thin plate or film. Here, the first electrode plate 111 may function as a positive electrode, and the second electrode plate 112 may function as a negative electrode.

The first electrode plate 111 is formed by applying a first electrode active material, such as a transition metal oxide, to a first electrode collecting plate formed of metal foil, such as aluminum foil. The first electrode plate 111 includes a first electrode uncoated portion 111a to which the first electrode active metal is not applied. The first electrode uncoated portion 111a functions as a current passage between the first electrode plate 111 and the outside of the first electrode plate 111. In the present embodiment, materials that can be used to form the first electrode plate 111 are not limited to the above-mentioned materials.

The second electrode plate 112 is formed by applying a second electrode active material, such as graphite or carbon, to a second electrode collecting plate formed of metal foil, such as copper or nickel foil. The second electrode plate 112 includes a second electrode uncoated portion 112a to which the second electrode active metal is not applied. The second electrode uncoated portion 112a functions as a current passage between the second electrode plate 112 and the outside of the second electrode plate 112. In the present embodiment, materials that can be used to form the second electrode plate 112 are not limited to the above-mentioned materials.

The first electrode plate 111 and the second electrode plate 112 may be arranged such that the polarities of the first and second electrode plates 111 and 112 may be switched from the above description.

The separator 113 may be located between the first electrode plate 111 and the second electrode plate 112 to prevent a short circuit and to allow movement of lithium ions. The separator 113 may be formed of a polyethylene film, a polypropylene film, or a film including polyethylene and polypropylene. In the present embodiment, materials that can be used to form the separator 113 are not limited to the above-mentioned materials.

The first and second collector plates 120 and 130 are coupled to both end parts of the electrode assembly 110 in a manner such that the first and second collector plates 120 and 130 are electrically coupled to the first and second electrode plates 111 and 112, respectively.

The first collector plate 120 is made of a conductive material, such as aluminum or an aluminum alloy, and contacts the first electrode uncoated portion 111a that protrudes toward one end of the electrode assembly 110, so that the first collector plate 120 can be electrically coupled to the first electrode plate 111. The first collector plate 120 includes a first connecting portion 121, a first extending portion 123, a first terminal hole 124 and a first fuse hole 125.

The first extending portion 123 of the first collector plate 120 is bent, extends from an end of the first connecting portion 121, and has a plate shape substantially contacting the first electrode uncoated portion 111a. Here, assuming that a corner at which the first connecting portion 121 and the first extending portion 123 meet is denoted by reference character 'C1', the first connecting portion 121 and the first extending portion 123 may be perpendicular to each other about the corner C1. The first terminal hole 124 provides for a space into which a first electrode terminal 152 of the cap assembly 150 is fitted and coupled. The first fuse hole 125 is formed between the first terminal hole 124 and the corner C1. The first fuse hole 125 is formed such that a fuse region of the first collector plate 120 has a smaller sectional area than another region that excludes the region in which the first terminal hole 124 is formed. The first fuse hole 125 may have a shape of a rectangle elongated in a widthwise direction of the first connecting portion 121, although the shape of the first fuse hole 125 is not limited thereto. The fuse region having the first fuse hole 125 may be melted or softened due to heat generated by a large amount of current flowing in the first collector plate 120 due to a short circuit of the electrode assembly 110, thereby functioning as a fuse that blocks current between each of the case 140, the cap plate 151, and the electrode assembly 110.

The second collector plate 130 is made of a conductive material, such as copper, a copper alloy, nickel, or a nickel alloy, and contacts the second electrode non-coating portion 112a that protrudes toward one end of the electrode assembly 110, so that the second collector plate 130 can be electrically coupled to the second electrode plate 112. The second collector plate 130 may include a second connecting portion 131, a second extending portion 133 and a second terminal hole 134.

The second extending portion 133 is bent, extends from an end of the second connecting portion 131, and has a plate shape and substantially contacts the second electrode uncoated portion 112a. Here, assuming that a corresponding corner at which the second connecting portion 131 and the second extending portion 133 meet is denoted by the corresponding reference character 'C2', the second connecting portion 131 and the second extending portion 133 may be perpendicular to each other about the corner C2. The second terminal hole 134 provides for a space into which a second electrode terminal 153 is fitted and coupled.

The case 140 may be made of a conductive metal, such as aluminum, an aluminum alloy, or nickel plated steel, and may have a substantially hexahedral shape having an opening through which the electrode assembly 110, the first collector plate 120, and the second collector plate 130 are inserted and arranged. Although the opening is not illustrated in FIG. 2, as the case 140 and the cap assembly 150 of the present embodiment are shown in an assembled state, the peripheral portion of the cap assembly 150 substantially corresponds to the opening in the case 140. Meanwhile, the interior surface of the case 140 is insulated, so that the case 140 is electrically insulated from the electrode assembly 110, the first collector plate 120, and the second collector plate 130.

The cap assembly 150 is coupled to the case 140. In detail, the cap assembly 150 includes a cap plate 151, a first electrode terminal 152, a second electrode terminal 153, a gasket (e.g., a pair of gaskets) 154, and a nut (e.g., a pair of nuts corresponding to the pair of gaskets) 155. In addition, the cap assembly 150 may also include a plug 156, a safety vent 157, a connecting plate 158, an upper insulating member 159, a displacement plate 160, and a short-circuiting member 161.

The cap plate 151 seals the opening of the case 140 and may be made of the same material as the case 140. In the present embodiment, the cap plate 151 may have the same polarity as the case 140.

The first electrode terminal 152 penetrates one side of the cap plate 151 and is electrically coupled to the first collector plate 120. The first electrode terminal 152 may have a pillar shape. Screw members are formed at an outer peripheral edge of an upper pillar of the first electrode terminal 152 exposed to an upper portion of the cap plate 151, and a flange 152a may be formed in a lower pillar of the first electrode terminal 152 positioned at a lower portion of the cap plate 151 to prevent the first electrode terminal 152 from being dislodged from the cap plate 151. A portion of the lower pillar positioned below the flange 152a of the first electrode terminal 152 is fitted into the first terminal hole 124 of the first collector plate 120. Here, the first electrode terminal 152 may be electrically coupled to the cap plate 151.

The second electrode terminal 153 penetrates the other side of the cap plate 151, and is electrically coupled to the second collector plate 130. Since the second electrode terminal 153 has substantially the same shape as the first electrode terminal 152, a description thereof will not be repeated. However, the second electrode terminal 153 may be electrically insulated from the cap plate 151.

The gasket(s) 154 are formed of an insulating material and is located between the first electrode terminal 152 and the cap plate 151 and between the second electrode terminal 153 and the cap plate 151 to seal respective gaps between the cap plate 151 and the first and second electrode terminals 152 and 153. The gasket 154 prevents permeation of external moisture into the secondary battery 100 or leakage of electrolyte from the inside of the secondary battery 100.

The nut(s) 155 are engaged with the screw member(s) formed in each of the first electrode terminal 152 and the second electrode terminal 153 to fix each of the first electrode terminal 152 and the second electrode terminal 153 to the cap plate 151.

The plug 156 seals an electrolyte injection hole 151a of the cap plate 151. The safety vent 157 is installed in a vent hole 151b of the cap plate 151 and has a notch 157a formed to be opened at a pressure (e.g., a predetermined pressure).

The connecting plate 158 is located between the first electrode terminal 152 and the cap plate 151, and allows the first electrode terminal 152 to be fitted thereto. The connecting plate 158 makes tight contact with the cap plate 151 and the gasket 154 due to the nut 155. The connecting plate 158 is electrically coupled to the first electrode terminal 152 and the cap plate 151.

The upper insulating member 159 includes a first upper insulating member 159a and a second upper insulating member 159b. The first upper insulating member 159a is located between the second electrode terminal 153 and the cap plate 151 and allows the second electrode terminal 153 to be fitted thereto. The first upper insulating member 159a makes tight contact with the cap plate 151 and the gasket 154. The first upper insulating member 159a insulates the second electrode terminal 153 and the cap plate 151 from each other. In addition, the second upper insulating member 159b is formed to cover a top portion of the short-circuiting member 161 to be described below.

Figure 3:
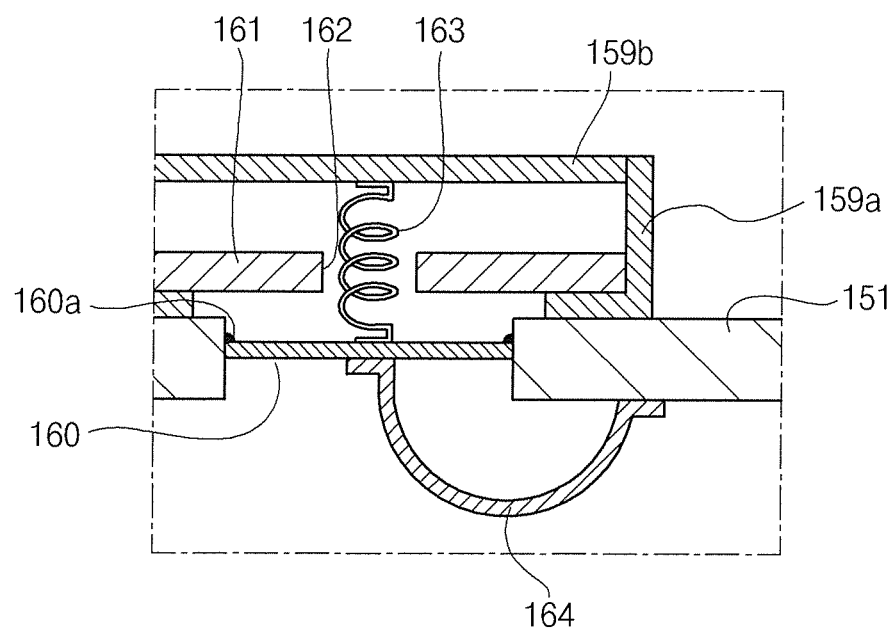
FIG. 3 is an enlarged cross-sectional view illustrating the '3' portion shown in FIG. 2.
Figure 4:
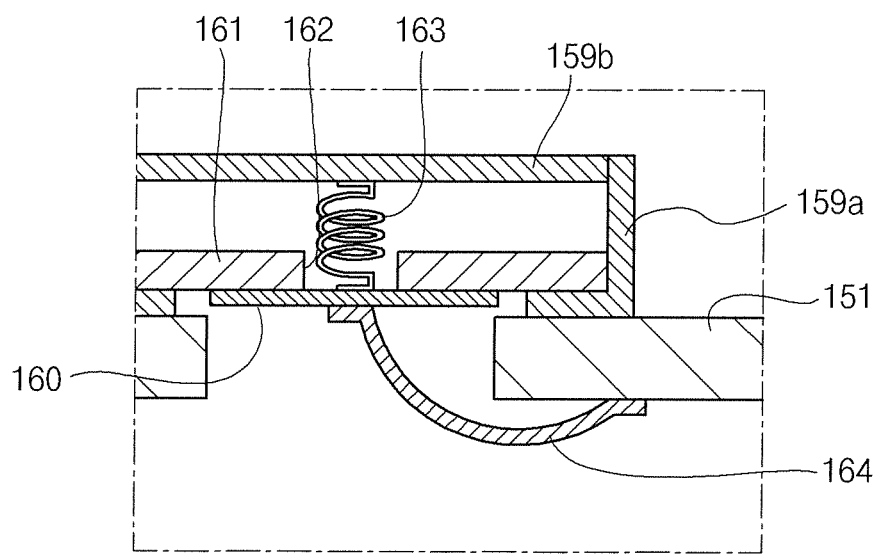
FIG. 4 is a cross-sectional view illustrating a state in which a short circuit is generated when the secondary battery shown in FIG. 3 is over-charged.

Referring to FIGS. 3 and 4, the displacement plate 160 is located in a first through-hole 151c (see FIG. 2) of the cap plate 151. The displacement plate 160 has a plate-shape. The displacement plate 160 of the present embodiment may have rectangular or circular shape, but shapes of the displacement plate 160 are not limited thereto. The displacement plate 160 may be fixed with the first through-hole 151c by welding portions 160a. In this case, the welding portions 160a of the displacement plate 160 are broken when internal pressure of the secondary battery 100 exceeds a pressure (e.g., a predetermined pressure) due to over-charge, so that the displacement plate 160 may move toward an upper portion of the cap plate 151. In the present embodiment, the displacement plate 160 may have the same polarity as the cap plate 151. When the displacement plate 160 moves to the upper portion of the cap plate 151, the displacement plate 160 is separated from the cap plate 151. However, the displacement plate 160 maintains an electrical connection state by a connecting member 164 to be described below. The displacement plate 160 may be fixed to the first through-hole 151c by an O-ring (not shown). When the displacement plate 160 is fixed within the first through-hole 151c by the O-ring, an increase internal pressure of the secondary battery 100 lifts the displacement plate 160 to the upper portion of the cap plate 151.

The short-circuiting member 161 is placed at an exterior side of the cap plate 151 to be spaced apart from the cap plate 151, that is, on the upper insulating member 159, and the second electrode terminal 153 is fitted into the short-circuiting member 161. In addition, the short-circuiting member 161 extends to cover the first through-hole 151c. The short-circuiting member 161 is electrically coupled to the second electrode terminal 153. The short-circuiting member 161 induces a short circuit by making electrical contact with the displacement plate 160 when the internal pressure of the secondary battery 100 exceeds a pressure (e.g., a predetermined pressure) due to over-charge of the secondary battery 100.

The short-circuiting member 161 includes a second through-hole 162. The second through-hole 162 is formed at a region corresponding to the displacement plate 160, and a width of the second through-hole 162 is smaller than that of the displacement plate 160.

The guide member 163 coupled to the top portion of the displacement plate 160 penetrates the second through-hole 162. One side of the guide member 163 is fixed to the inside of the second upper insulating member 159b positioned on the second through-hole 162, and the other side of the guide member 163 is fixed to the top portion of the displacement plate 160. The guide member 163 may be formed of a spring. The guide member 163 prevents the displacement plate 160 from moving by using elasticity of the spring until the internal pressure of the secondary battery 100 exceeds the aforementioned pressure (e.g., the predetermined pressure) due to over-charge of the secondary battery 100. However, when the internal pressure of the secondary battery 100 exceeds this pressure due to over-charge of the secondary battery 100, the increased internal pressure lifts the displacement plate 160 toward the upper portion of the cap plate 151 to make a contact with a bottom surface of the short-circuiting member 161. In the present embodiment, the guide member 163 may be a compressible spring.

In addition, the displacement plate 160 has conductivity and is electrically coupled to the cap plate 151 using the connecting member 164 that is flexible. The connecting member 164 is formed by a lead wire and an insulation member surrounding the lead wire. In addition, the insulation member is removed from opposite ends of the connecting member 164 to partially expose the lead wire and is fixed to the displacement plate 160 and the cap plate 151 by welding. Thus, since the displacement plate 160 is not integrally formed with the cap plate 151, but is fixed within the first through-hole 151c by the welding portions 160a, the displacement plate 160 may be thicker than in a case in which it is integrally formed with the cap plate 151. As a result, when the internal pressure of the secondary battery 100 exceeds a pressure (e.g., a predetermined pressure) due to over-charge of the secondary battery 100, defects, such as crumpling or ripping of the displacement plate 160 may be prevented, thereby increasing the safety of the secondary battery 100.

Next, a secondary battery according to another embodiment of the present invention will be described.

Figure 5:
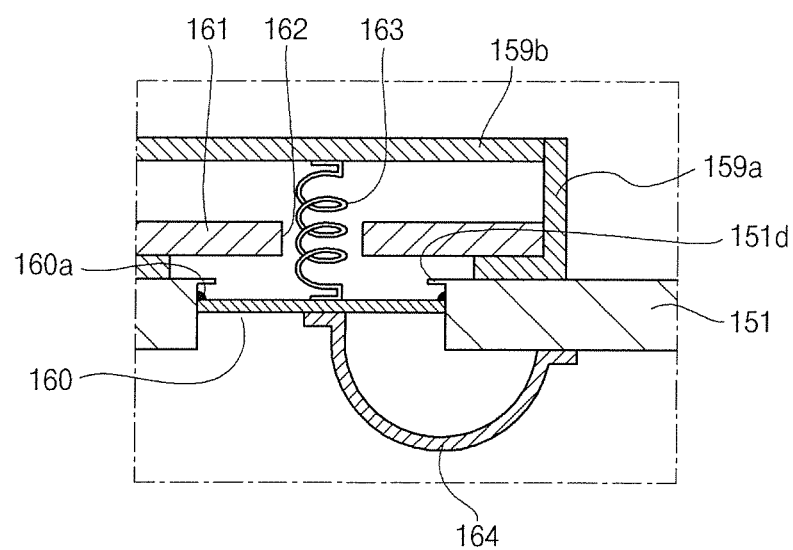
FIG. 5 is a cross-sectional view of a portion corresponding to FIG. 3 in a secondary battery according to another embodiment of the present invention.

FIG. 5 is a cross-sectional view of a portion corresponding to FIG. 3 in a secondary battery according to another embodiment of the present invention.

The secondary battery according to the another embodiment of the present invention is substantially the same as the secondary battery 100 of the embodiment shown in FIGS. 1 to 4, except for a configuration of a protrusion 151d formed at an outer circumferential edge of a first through-hole 151c. Accordingly, repeated explanations of configurations of the secondary battery according to the present embodiment of the present invention that are the same as those of the secondary battery 100 according to the previous embodiment may be omitted, and the following description will focus on the protrusion 151d formed at the outer circumferential edge of the first through-hole 151c.

Referring to FIG. 5, the protrusion 151d protrudes in the first through-hole 151c (see FIG. 2) of the cap plate 151. When the internal pressure of the secondary battery exceeds a pressure (e.g., a predetermined pressure) due to over-charge, the displacement plate 160 allows the protrusion 151d to be temporarily hung thereon, and the displacement plate 160 ruptures the protrusion 151d and makes contact with a bottom surface of the short-circuiting member 150, inducing a short circuit.

Next, a secondary battery according to still another embodiment of the present invention will be described.

Figure 6:
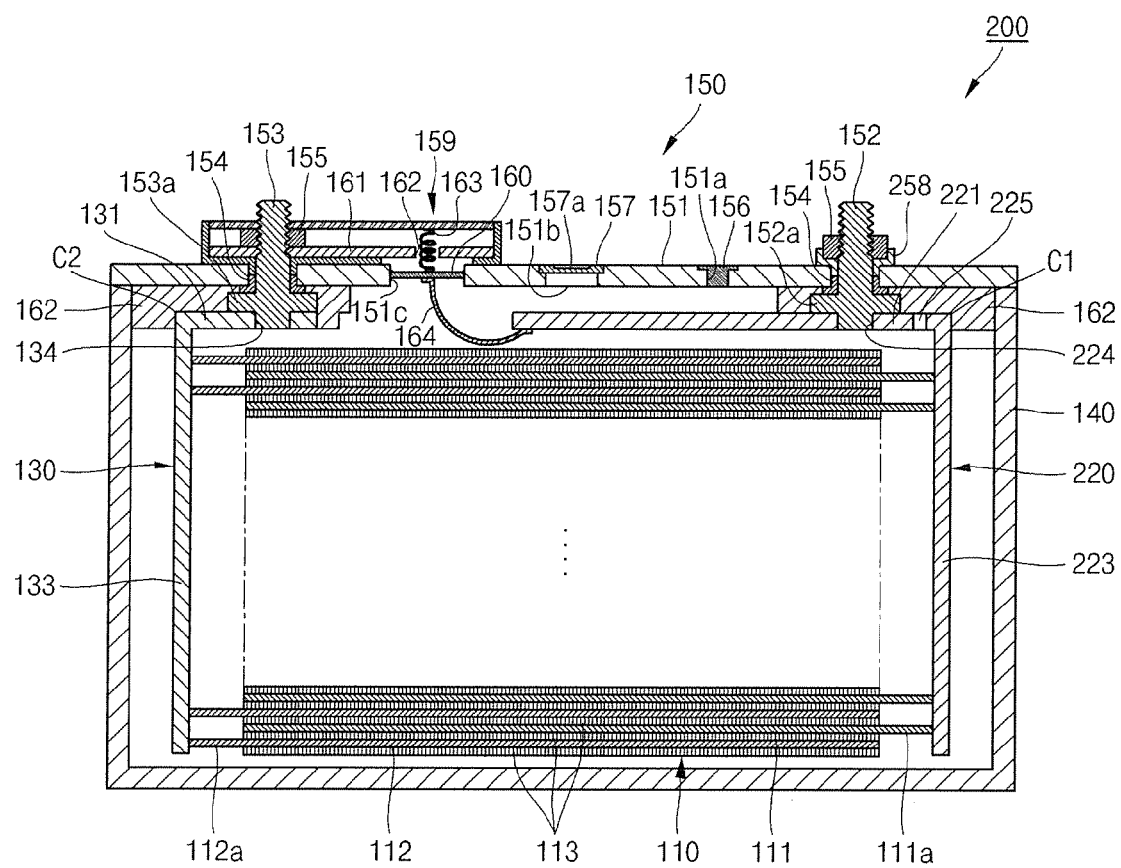
FIG. 6 is a cross-sectional view of a portion corresponding to FIG. 2 in a secondary battery according to still another embodiment of the present invention.

FIG. 6 is a cross-sectional view of a portion corresponding to FIG. 2 in a secondary battery according to still another embodiment of the present invention.

Referring to FIG. 6, the secondary battery 200 includes a third upper insulation member 258 to electrically insulate a case 140 and a cap plate 151. The third upper insulation member 258 is located between a first electrode terminal 152 and the cap plate 151, and the first electrode terminal 152 is fitted into the third upper insulation member 258.

The secondary battery 200 is coupled to a first collector plate 220 to allow the displacement plate 160 to be electrically coupled to one of a first electrode and a second electrode. The first collector plate 220 is configured such that a first connecting portion 221 extends to be contiguous to the displacement plate 160. The first connecting portion 221 is coupled to one side of the connecting member 164, and the other side of the connecting member 164 is coupled to a bottom surface of the displacement plate 160. The connecting member 164 electrically couples the displacement plate 160 and the first collector plate 220.

When an internal pressure of the secondary battery 200 exceeds a pressure (e.g., a predetermined pressure, or a sufficient internal pressure) due to over-charge, the displacement plate 160 makes a contact with a bottom surface of the short-circuiting member 161, thereby inducing a short circuit. If the short circuit is induced, a large amount of current may flow, generating heat. Here, a fuse region having a fuse part 225 of the first collector plate 220 functions as a fuse, thereby shutting down the flow of current. In addition, since the case 140 and the cap plate 151 are electrically neutralized after the over-charge is generated, the safety of the secondary battery 200 may be improved.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims and their equivalents.

What is claimed is:

1. A secondary battery comprising:
   an electrode assembly comprising a first electrode, a second electrode, and a separator between the first electrode and the second electrode;
   a case accommodating the electrode assembly;
   a cap assembly comprising:
      a cap plate having a first through-hole and coupled to the case; and
      a short-circuiting member electrically coupled to one of the first and second electrodes; and
   a displacement plate in the first through-hole and spaced from a bottom surface of the short-circuiting member at a first position, and configured to be separated from the first through-hole and to contact the bottom surface of the short-circuiting member at a second position.

2. The secondary battery of claim 1, wherein the displacement plate is welded to the cap plate.

3. The secondary battery of claim 2, wherein one or more welding portions of the displacement plate are configured to be ruptured when the displacement plate moves from the first position to the second position.

4. The secondary battery of claim 1, wherein the cap plate further comprises a protrusion protruding toward an interior of the first through-hole.

5. The secondary battery of claim 4, wherein the protrusion is configured to be broken by movement of the displacement plate.

6. The secondary battery of claim 1, wherein the displacement plate is electrically coupled to the cap plate by a connecting member, and is configured to remain electrically coupled to the cap plate when the displacement plate moves.

7. The secondary battery of claim 6, wherein the connecting member comprises:
   a lead wire having exposed ends and configured to be fixed to the displacement plate; and
   an insulating member partially surrounding the lead wire.

8. The secondary battery of claim 1, wherein the short-circuiting member has a second through-hole at a location corresponding to the displacement plate.

9. The secondary battery of claim 8, wherein the second through-hole has an area that is smaller than that of the displacement plate.

10. The secondary battery of claim 8, further comprising a guide member at least partially located in the second through-hole and comprising a first side coupled to a top surface of the displacement plate and a second side coupled to an upper insulating member on the short-circuiting member.

11. The secondary battery of claim 10, wherein the guide member comprises a spring.

12. The secondary battery of claim 1, further comprising:
   a first collector plate electrically coupled to the first electrode; and
   a second collector plate electrically coupled to the second electrode,
   wherein the displacement plate is electrically coupled to one of the first collector plate or the second collector plate by a connecting member.

13. The secondary battery of claim 12, wherein the first collector plate comprises a first extending portion coupled to the first electrode, and a first connecting portion extending from the first extending portion and coupled to a first electrode terminal of the first electrode.

14. The secondary battery of claim 13, wherein the first connecting portion comprises a fuse region.

15. The secondary battery of claim 12, wherein the second collector plate comprises a second extending portion coupled to the second electrode, and a second connecting portion extending from the second extending portion and coupled to a second electrode terminal of the second electrode.

\* \* \* \* \*